United States Patent [19]

Vincent

[11] 4,042,305

[45] Aug. 16, 1977

[54] QUICK CHANGE SNAP LOCK CONNECTOR

[76] Inventor: George E. Vincent, 110 N. 153rd East Ave., Tulsa, Okla. 74116

[21] Appl. No.: 608,459

[22] Filed: Aug. 28, 1975

[51] Int. Cl.² .......................... F16B 7/00; F16D 1/10
[52] U.S. Cl. .................................... 403/14; 403/328; 403/354; 15/104.3 SN
[58] Field of Search ............... 403/328, 354, 324, 13, 403/14, 379, 355, 182; 15/104.3 SN

[56] References Cited

U.S. PATENT DOCUMENTS

| 2,278,324 | 3/1942 | Kollmann | 403/182 |
| 2,639,160 | 5/1953 | Studebaker et al. | 403/354 X |
| 2,648,247 | 8/1953 | Schmuziger | 85/8.3 |
| 2,673,996 | 4/1954 | Gerber | 403/328 X |
| 2,696,090 | 12/1954 | Harrington | 403/9 |
| 3,024,326 | 3/1962 | Wischhusen | 85/8.3 X |
| 3,449,003 | 6/1969 | Hunt | 403/324 |

Primary Examiner—Andrew V. Kundrat
Attorney, Agent, or Firm—Head, Johnson & Chafin

[57] ABSTRACT

A quick change connector for use in connecting flexible rotating shafts. The device comprises a cylindrical segment and cooperating sleeve member which are locked into engagement by means of a depressable latch pin member. The sleeve is provided with a transversely disposed bar and the cylindrical segment is provided with a transversely disposed slot capable of receiving the bar therein for transmitting torque through the connector without applying said torque to the latch pin.

7 Claims, 6 Drawing Figures

U.S. Patent   Aug. 16, 1977   4,042,305

QUICK CHANGE SNAP LOCK CONNECTOR

BACKGROUND OF THE INVENTION

1. Field of the Invention

The present invention relates to a torque transmitting connector for use with rotating tools and the like and more particularly but not by way of limitation to a cylindrical segment and sleeve member having a depressable latch pin for connecting the two in engagement. The torque is transmitted through the connector device by means of a bar and cooperating slot independent of the latch pin.

2. Description of the Prior Art

Presently, most every plumber employs the use of some sort of rotating flexible cable with a cutting tool at one end thereof to clean sewers of roots and the like. There are often occasions when additional cable is needed to dislodge an obstruction far into the sewer pipe. Therefore, there is a need for a quick change connector to more efficiently connect extra lengths of cable between the tool cable and the rotating power source.

Presently available connectors normally comprise a complicated screw type connector or a snap lock wherein the latching mechanism carries the torque load from one flexible cable segment to the next. Often these latching mechanisms, being necessarily movable do not have the strength to withstand either the torque and vibration or the pushing force required to engage the cutting tool with the obstruction.

There are many other applications for torque transmitting connectors wherever rotating flexible cables are used. It is extremely helpful to be able to quickly disconnect flexible cables or the like in working on a device to which they are attached.

There are two overriding requirements in the design of such a connector and those are that they reliably transmit the torque necessary to do the job and they do not accidentally disengage thereby losing the remote tool.

SUMMARY OF THE INVENTION

The present invention is particularly designed and constructed for overcoming the above disadvantages and for providing a quick change snap-lock connector which positively transmits torque from one cable segment to the next while maintaining a high reliability in the latching mechanism. Almost any latch may be made strong enough for a particular job if the parts are made large enough. However, in many flexible rotating cable applications the connector must be relatively small in diameter and the latch mechanism may not be beefed up.

The present invention provides a telesoping cylindrical segment and cooperating sleeve member which when engaged are latched by a depressable pin and cooperating bore. However, the sleeve is provided with a transversely disposed torque bar and the cylindrical segment is provided with a transversely disposed cooperating slot for receiving the bar. The torque is transmitted by the bar and slot leaving the latch pin relatively free of any torque forces.

Further the cylinder and sleeve are provided with a stop means so that any pushing of the cable or compressive loads on the connector are taken out by the sleeve and cylindrical segment and not by the latching pin. Therefore, it is apparent that the only forces seen by the latch pin are those exerted in removing the tool or pulling same out. These forces however are usually relatively light with respect to those of pushing the tool into the obstruction to be removed.

DESCRIPTION OF THE DRAWINGS

Other and further advantageous features of the present invention will hereinafter more fully appear in connection with a detailed description of the drawings in which.

DETAILED DESCRIPTION OF THE PREFERRED EMBODIMENT

Figure 1:
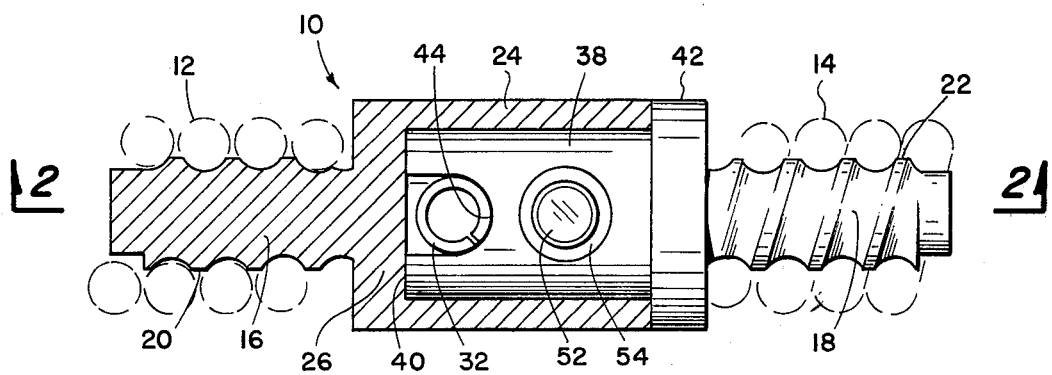
FIG. 1 is a partial sectional view of connector embodying the present invention.
Figure 2:
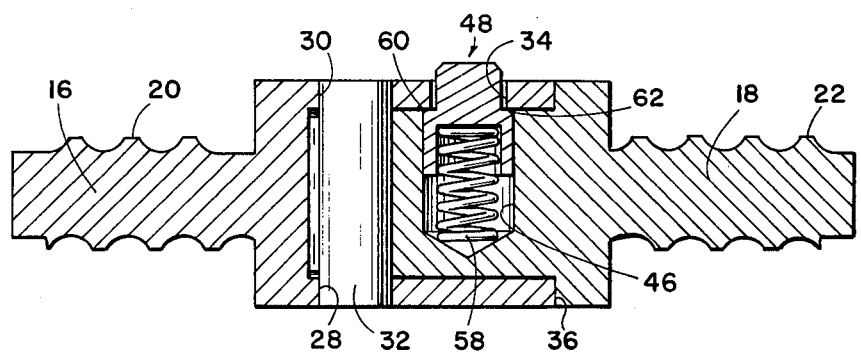
FIG. 2 is a sectional view of the connector of FIG. 1 taken along the broken lines 2—2 of FIG. 1.
Figure 3:
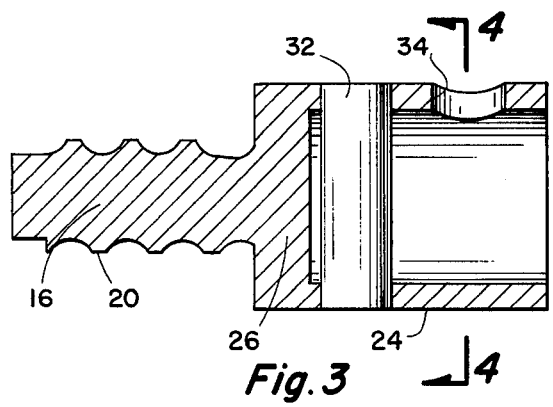
FIG. 3 is a partial sectional view of the female portion of the connector of FIG. 1.
Figure 4:
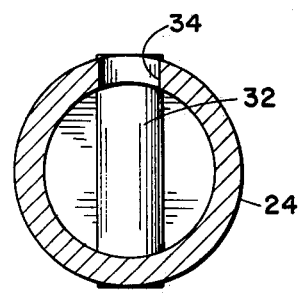
FIG. 4 is an end sectional view of the female portion of the connector taken along lines 4—4 of FIG. 3.
Figure 6:
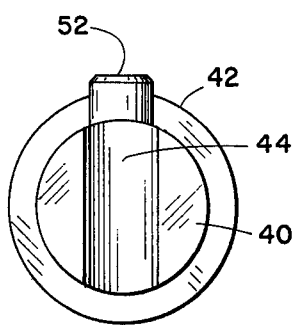
FIG. 6 is an end view of the male portion of the connection as shown in FIG. 5.
Figure 5:
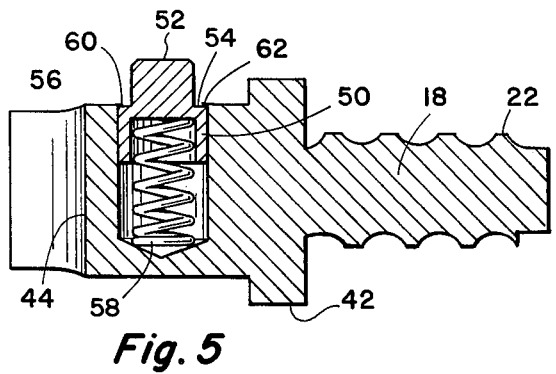
FIG. 5 is a sectional view of the male portion of the connector of FIG. 1.

Referring to the drawings in detail, reference character 10 generally indicates a quick change snap lock connector for connecting end segments 12 and 14 of flexible rotating shafts or the like. It is noted that the shafts 12 and 14 may be of many configurations. However, the most common is that of a modified bowden sheath which has a plurality of coils resembling threads. As shown in the present establishment the connector 10 is provided with outwardly extending threaded stud members 16 and 18 which are threadably connected to the flexible shaft in segments 12 and 14 and are shown in FIG. 1.

It is noted that the threads on studs 16 and 18 have flattened crests 20 and 22 which aid in cutting or gripping the interior surface of the flexible shaft segments 12 and 14. However, as hereinbefore stated the connector device may be attached to the flexible end segments by any number of means including that of welding each connector segment with respect to its flexible shaft end segment.

The connector 10 generally comprises a cylindrical sleeve member 24 closed at one end by the end plate 26. The threaded stud or other attachment member 16 is then secured to the end plate 26 in any well known manner. However, in the presently shown embodiment the sleeve member 24, end plate 26 and associated attachment stud member 16 are made from a single piece of material. Sleeve member 24 is provided with a pair of oppositely disposed aligned bores 28 and 30 for receiving a bar 32 therethrough. The bores 28 and 30 are disposed adjacent to end plate 26. The bar 32 will be hereinafter referred to as a torque bar and is constructed normally of a durable material such as rolled spring steel or the like. The bar 32 is extremely rigid and is normally swedge fitted by a spring action within the bores 28 and 30 as shown in FIG. 1.

The sleeve member 24 is also provided with another bore 34 therein which is located between the torque bar 32 and the open end 36 of the sleeve member.

The components associated with the sleeve member 24 constitute the female portion of the connector.

The male portion of the connector comprises a cylindrical segment 38 which is normally constructed of solid steel. It is of a length substantially equal to the distance from the sleeve open end 36 to the end 26 so that when the cylindrical segment 38 is fully inserted into the sleeve member 24 the end portion 40 of the cylindrical segment will contact the end plate 26. The diameter of the cylindrical segment 38 is substantially equal to the inside diameter of the sleeve member 24 to allow easy insertion and retraction within the said sleeve member 24.

The opposite end of the cylindrical segment 38 is provided with a flange 42 which normally is constructed having an outside diameter substantially equal to the outside diameter of the sleeve member 24. The threaded stud or similar attachment device 18 is secured to the flange member 42 opposite the cylindrical segment 38. As shown in the preferred embodiment, the cylindrical segment 38, flange member 42 and the stud member 18 are constructed from one piece of material. The outer end of the cylindrical segment 38 is provided with a transversely disposed slot recess 44 having a width or interior shape complimentary to the shape of the torque bar 32 and for the purpose of receiving the torque bar 32 therein when the cylindrical segment 38 is inserted within the sleeve member 24. The torque bar 32 and cooperating slot 44 are constructed to have low tolerance in order that there be very little play between the two cooperating parts when torque is applied.

The cylindrical segment 38 is also provided with a transversely disposed bore 46 in one side thereof, the bore 46 being positioned on the cylindrical segment in substantial alignment with the bore 34 of the sleeve member 24 when the cylindrical segment is inserted within the sleeve member and the torque bar 32 is engaged within the slot 44. The bore 46 extends part way into the cylindrical segment 38 for reciprocally receiving a latch pin generally indicated by reference character 48. The latch pin 48 comprises a cylindrical segment 50 being reduced at one end thereof to form a cylindrical pin member 52 and an annular shoulder portion 54. The cylindrical segment opposite the pin member 52 is provided with a bore 56 in the end thereof for receiving a helical compression spring 58 therein.

In assembly, the compressable spring 58 is inserted within the bore 46 and the cylindrical portion 50 of the latch pin 48 is inserted on the top of the spring, receiving one end of the spring within the bore 56. The pin 52 is depressed to a position so that the shoulder 54 is below the surface of the cylindrical segment 38. A punch tool or the like (not shown) is then utilized to deform the cylindrical segment at the outer opposite edges of the bore 46 and more particularly at the points 60 and 62 to form protrusions which extend over the annular shoulder 54 of the pin member to hold the pin member within the bore 56 against the force of the spring 58. It is noted that the diameter of the cylindrical portion 50 of the pin member should be substantially equal to that of the bore 46 but to allow easy reciprocation of the pin member therein. It is further noted that the overall length of the latch pin 48 should be no greater than the depth of the bore 46 so that upon insertion of the cylindrical segment 38 within the sleeve member 24 the pin can be completely depressed within the bore 46.

It is further pointed out that the bore 34 within the sleeve member 24 should be large enough so that the sides of the pin segment do not touch the walls of the said bore 34 when torque is applied through the connector. It should also be of a diameter large enough that the wall of the pin segment 52 does not contact the wall of the bore 34 when compressive force is applied across the connector 10. This compressive force is taken out by any one of three areas of the connection. The force may be taken out by the end portion 40 of the cylindrical segment contacting the end plate 26 of the female portion of the connector. Secondly, it may be taken out by the slot 44 contacting the torque bar 32 and thirdly may be taken out by the flange member 42 contacting the end portion 36 of the sleeve member 24.

It can be readily seen that the connector hereinbefore described may be utilized in many operations where it is necessary or desirable to connect or disconnect flexible lines or tools utilizing flexible rotating cables. In normal use, the plumber or workman will have pre-secured the respective male and female connectors to the ends of his flexible cables normally used in his work. When it is desirable to connect the end segments 12 and 14 of these flexible cables together he simply depresses the latch pin 48 within the bore 46 and inserts the cylindrical segment portion 36 fully within the sleeve member 24 so that the torque bar 32 fully engages the slot 44. The pin member latch pin 48 is then automatically released when it comes into alignment with the bore 34 in the sleeve 24.

As hereinbefore stated the torque load applied through the connector 10 and the pushing forces applied to the connector 10 are fully taken out by the nonmovable parts thereof, namely the torque bar 32 and slot 34 and the end portions of the sleeve member and cylindrical segment member.

The only time that any side loads are brought to bear against the latching pin 48 is upon removal of the connector from the line wherein pulling on the connector will bring one side of the pin member 52 into contact with the wall of the bore 34. However, normally there is not very much force associated with removing the tool from the job or at least not nearly so much as pushing the tool into the job.

Whereas, the present invention has been described with particular relation to the drawings attached hereto, it is obvious that other further modification apart from those shown are suggested herein and may be made within the spirit and scope of this invention.

What is claimed is:

1. A connector for a flexible rotating shaft comprising:
   a. a sleeve member having one end closed, a shaft connector means secured to the outer side of the closed end of the sleeve member, a transversely disposed torque bar secured inside the sleeve member adjacent the closed end thereof;
   b. an elongated solid cylindrical segment having outside diameter substantially equal to the inside diameter of said sleeve number for selective insertion therein, a flange member secured to one end of the cylindrical segment, shaft connector means secured to the outside of the flange member opposite the cylindrical segment, a transversely disposed slot provided in the opposite end of the cylindrical segment for slidably receiving the torque bar therein when the cylindrical segment is inserted into the sleeve member to prevent rotation of said cylindrical segment with respect to said sleeve member, spring loaded depressable latch pin carried by the cylindrical segment, between said slot and said flange member, a transversely disposed bore provided in the sleeve member for receiving said latch pin therein when the cylindrical segment is fully inserted into the sleeve member with said torque bar disposed in the said transverse slot and transversely disposed bore provided in the sleeve member for receiving the latch pin is of greater diameter than said latch pin sufficient to prevent said latch from taking torqueloads when the connector is rotated.

2. A connector as set forth in claim 1 wherein the depressable pin comprises a bore extending transversely into the solid cylindrical segment, a helical compression spring disposed within the bore, a pin member insertable within the bore having a recess at one end thereof for receiving one end of the spring therein, a pin engagement portion at the opposite end of the pin member, shoulder means provided around the outer periphery of the pin between the pin engagement portion and the spring recess, a pair of oppositely disposed protrusions provided in the cylindrical segment at the bore, said protrusions being in engagement with the pin shoulder means for holding said pin within the bore.

3. A connector as set forth in claim 2 wherein the shoulder means is formed by the pin engagement portion being of a smaller diameter than the remainder of the pin.

4. A connector as set forth in claim 3 wherein the protrusions comprise staked-in deformations in the edge of the pin bore.

5. A connector as set forth in claim 1 wherein the shaft connector means for the cylindrical segment and the sleeve member comprises a pair of oppositely disposed outwardly extending threaded attachment studs, the threads being in the same direction for each stud.

6. A connector as set forth in claim 5 wherein the threads of the shaft connector means have flattened crests and are of hardened material for cutting into and gripping the flexible shaft material.

7. A connector as set forth in claim 1 wherein the sleeve member comprises a pair of oppositely disposed bores adjacent the closed end thereof and the torque bar comprises a cylindrical segment of rolled spring steel swedged by spring action within said oppositely disposed bores.

* * * * *